United States Patent [19]

Primus

[11] 4,261,137
[45] Apr. 14, 1981

[54] PHASE II OF MUSHROOM PRODUCTION

[76] Inventor: John M. Primus, 712 Creek Rd., Kennett Square, Pa. 19348

[21] Appl. No.: 37,672

[22] Filed: May 10, 1979

[51] Int. Cl.³ ............................................. A01G 1/04
[52] U.S. Cl. ..................................................... 47/1.1
[58] Field of Search .......................................... 47/1.1

[56] References Cited
U.S. PATENT DOCUMENTS

| | | | |
|---|---|---|---|
| 2,592,711 | 4/1952 | Knaust et al. | 47/1.1 X |
| 3,820,278 | 6/1974 | Giasante | 47/1.1 |

OTHER PUBLICATIONS

Successful Mushroom Growing, Chester County Mushroom Labs., West Chester, Pa., 1932, pp. 20-21, relied on.

Primary Examiner—Robert E. Bagwill
Attorney, Agent, or Firm—Connolly and Hutz

[57] ABSTRACT

The Phase II pasteurization stage in mushroom production is improved by introducing into the mushroom house or Phase II room at low pressure a volume of fresh air to provide temperature controlled oxygen for the compost in the mushroom house or Phase II room.

4 Claims, 14 Drawing Figures

PHASE II OF MUSHROOM PRODUCTION

BACKGROUND OF INVENTION

The vegetative mushroom mycelium needs a selective medium in which to colonize. This medium is referred to as compost. Compost, which is a combination of different materials, makes the end product balanced with the guidelines set for carbon, nitrogen, moisture, Ph, ash and ammonia. There is no set formula for compost, since one can select materials from a wide variety. Once the materials and their amounts have been chosen, the dynamic process of composting occurs in a two phase aerobic thermophilic sequence, in which bacteria actinomycetes and fungi act in a sequence of dominance.

Phase I is the outdoor segment and involves a temperature range of about 140° F.–170° F. Its purpose is to promote healthy growth of thermophilic bacteria. Phase I results in (1) the formation of homogeneous material by mixing with the addition of water, until the mixture contains 72%±2% water; (2) the initiation of microbiological fermentation of the compost through aerobic thermophilic micro-organisms which convert waste material to organic protein, carbohydrates and vitamins; and (3) the carrying out of caramelization.

Phase II is the indoor segment and has as its purpose the pasteurization and final conditioning of the compost by microbial conversions by means of aerobic thermophilic actinomycetes and fungi.

Pasteurization has been a major development in the commercial mushroom industry. The purposes of pasteurization are: (1) to destroy competitor moulds, pathogens and pests which can be achieved by a uniform temperature of 140° F. for thirty minutes; and (2) to initiate the rapid growth of aerobic thermophilic actinomycetes, which thrive between 130° F. and 150° F. and are responsible for the selective nature of the compost.

Two types of efficient Phase II are low temperature and modified low temperature where there has been inefficient Phase I. For low temperature Phase II the following steps are used: (1) fill; (2) pre-pasteurization for aerobic thermophilic fungi growth at 115° F. to 130° F.; (3) pasteurization for aerobic thermophilic actinomycetes action growth at 130° F. to 150° F.; and (4) post-pasteurization for aerobic thermophilic fungi growth at 115° F. to 130° F. Modified low temperature Phase II uses the steps of: (1) fill; (2) pre-pasteurization for aerobic thermophilic bacteria at 130° F. to 145° F.; (3) pasteurization for aerobic thermophilic bacteria at 140° F. to 150° F.; and (4) post-pasteurization either for twenty-four hours for aerobic thermophilic actinomycetes at 135° F. to 140° F. or for aerobic thermophilic fungi at 115° F. to 130° F.

Inefficient Phase II can occur with the steps of: (1) fill; (2) pasteurization (with or without pre-pasteurization) with aerobic thermophilic actinomycetes at 135° F. to 145° F. or anaerobic thermophilic bacteria at 150° F. to 162° F.; and (3) post-pasteurization where there is an over-ride at high temperature for a prolonged time and aerobic thermophilic fungi at 120° F. to 130° F. or a bottom out and recycle with distortion of aerobic thermophilic microbial dominance.

Due to the conventional methods of pasteurization and its inefficiencies, however, the grower may be confronted with several problems. Presently, live steam at 100 to 125 psi which is equal to approximately 330° F., is used to obtain and maintain pasteurization of the air and bed temperature of 140° F. Live steam, however, has numerous disadvantages. For example, one disadvantage is the inability to obtain a uniform temperature, which makes it necessary to lengthen the pasteurization time from ½ hour to 6 hours to insure the heat penetration to the cold portions of the compost, i.e., sideboards and bottom beds and house. Further in order to raise the air temperature, it is necessary to restrict the fresh air (oxygen) going into the mushroom plant or Phase II room almost completely.

By the lengthening of pasteurization, to enable the cold portions of the bed which occupy approximately 10% of the volume of compost to achieve 140° F., it is most probable that the cores, the warmest portions of the bed which occupy approximately 70% of the volume, would achieve a temperature between 150° F. to 162° F.

The following summarizes the complexity of the problems caused with live steam:

(1) with temperatures of 150° F. and higher, thermophilic bacteria are initiated, thus interrupting the sequence of an efficient Phase II;

(2) also by obtaining temperatures of 150° F. plus, the thermophilic actinomycetes, which should flourish during pasteurization, are being destroyed at a rapid rate. Also, the heat which is generated by the biology of the thermophilic bacteria is the cause of the high and uncontrollable over-ride temperatures during the post-pasteurization period;

(3) even if the bed temperature is held below 150° F., since the mushroom plant or Phase II room has been restricted of fresh air (oxygen) to allow the rise in air temperature, the aerobic microbial activity is also restricted due to lack of oxygen. It may be restricted so severely that anaerobic microbes will be initiated. This oxygenpoor state of pasteurization during the conventional Phase II can be more destructive to the aerobic thermophilic fungi and actinomycetes than the high temperatures discussed above. Also, since the aerobic microbial activity was restricted during pasteurization, during post-pasteurization when fresh air is being introduced into and exhausted from the mushroom house or Phase II room for cooling, it rejuvenates the microbial activity that generates heat, as discussed above, to add to temperature over-rides.

At present, with the conventional Phase II, it is common belief to the growers that for an efficient Phase II, one should have the capacity of moving 1 cfm (cubic foot per minute) per square foot of growing area per 100 ton of compost. (For example, 60 foot double=8,000 square feet; 100 tons=approximately 160 cubic yards of compost; thus, 8,000 square feet filled with 160 cubic yards needs the capacity of 8,000 cfm of fresh air.)

Live steam additionally is inefficient for uniformity. Conventionally the flow of live steam, when dumped into the mushroom house or Phase II room is:

(1) under 100 to 125 psi and acts like a vacuum which pulls the air from that part to the opposite side, causing a draft;

(2) since the live steam is at approximately 330° F., which is much hotter than the air temperature, the excessive heat rises; and (3) since the heat source is approximately 330° F., which is approximately 240% more heat than necessary, the warmest portion of the compost rises in temperature at approximately the same rate as the cold portions.

Other unpredictable occurences can prolong the time of Phase II. For example, the biological activity in the compost cannot be completed in as short a time as possible due to lack of oxygen and/or temperature. The off-shoot of this is that the energy of the compost, which is formed from the biological conversions, could become exhausted, thus leaving too high an amount of unconverted ammonia in the compost. Additionally due to an inefficient Phase I, many anaerobic microbes are formed, resulting in an inefficient Phase II, and yield is retarded.

The unfortunate fate of a prolonged Phase II or anaerobic microbial activity, is the unnecessary loss of dry matter (weight) which is the master key to yield efficiency.

SUMMARY OF INVENTION

An object of this invention is to provide an efficient Phase II which is an improvement over prior techniques.

A further object of this invention is to provide such an improved Phase II which results in a consistently improved pasteurization stage of Phase II.

A still further object of this invention is to provide such an improved pasteurization stage which results in a sharp break upon reaching the pasteurization peak with minimal over-ride temperature increase.

A still further object of this invention is to provide an improved pasteurization stage of Phase II which requires minimal cfm of air to the growing area.

Applicant has recognized that for 1 cfm per square foot of growing area, only 3.1% is needed for oxidation of the biologocial activities, 13.2% is needed for the $CO_2$ removal, and 83.7% is required for the removal of water vapor. (Thus for 8,000 cfm, 248 cfm is for oxidation, 1056 cfm is for $CO_2$ removal, and 6696 cfm is for $H_2O$ vapor removal). The main reason for such a massive cfm requirement for the removal of $H_2O$ vapors, is that during the conventional Phase II, the house, its atmosphere and the beds are subjected to generous and almost continuous amounts of condensation, either by the cool fresh air forming condensation when entering the warm atmosphere of the mushroom house or Phase II room, or by the condensation deposited in the house by the live steam. If it were possible to eliminate that condensation, it would be virtually possible to eliminate 6500 cfm.

The hitherto believed requirement for the air flow is substantially reduced in accordance with this invention, and an efficient Phase II is achieved by providing sufficient fresh air and bed temperature for the necessary biological conversions in the shortest time possible for a given compost. With the practice of this invention, the use of live steam is completely avoided, and instead a volume of fresh air, which is inherently oxygen rich, is introduced in the mushroom house or Phase II room at low pressure such as by gently blowing atmospheric air from an air intake unit exposed to the atmosphere outside the mushroom house or Phase II room. If the air is below the desired temperature, heating means such as a steam boiler is utilized to raise the temperature to the required amount. The steam boiler, however, functions solely to increase the temperature of the fresh air and does not function to mix live steam with the fresh air.

DETAILED DESCRIPTION

In general this invention is practiced by providing sufficient fresh air and bed temperature to the compost in the mushroom house or Phase II room. In essence, the invention may thus be considered as providing temperature controlled oxygen to the compost to properly condition the compost in a most efficient manner. For example, in conditioning compost during Phase II, ammonia is converted into usable nitrogen, and the bed compost is maintained at a temperature best suited for aerobic microbe activity. Additionally, it is necessary to have the proper amount of moisture since mushrooms are generally about 95% water. With the practice of the invention, fresh air taken from outside of the mushroom house or Phase II room is gently blown into the mushroom house or Phase II room. Since fresh air is inherently rich in oxygen, the required amount of oxygen is inherently provided for the compost.

Figures 1, 2, 3:
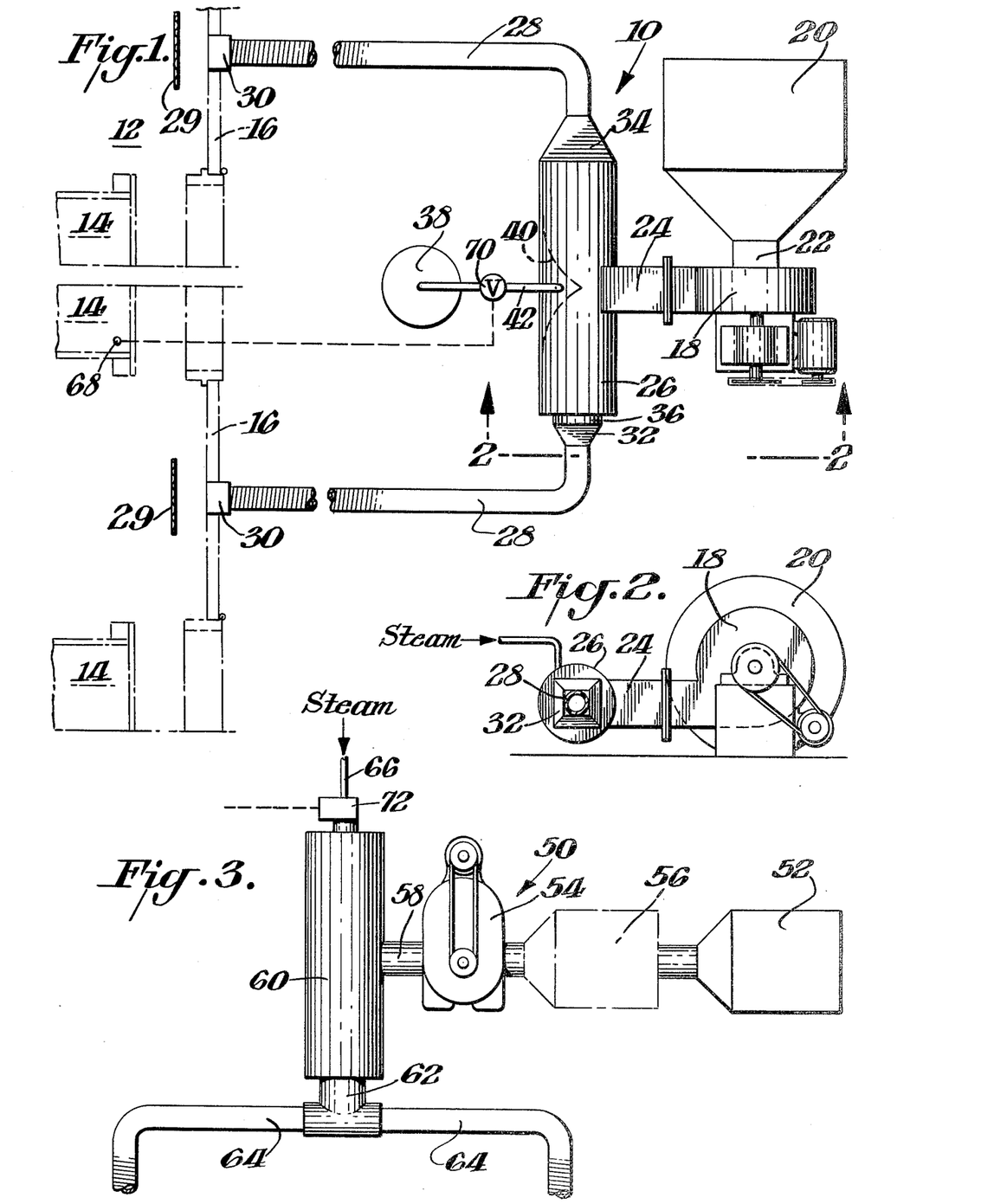
FIG. 1 is a schematic plan view of a device for providing an efficient Phase II in accordance with this invention.
FIG. 2 is a cross-sectional view taken through FIG. 1 along the line 2—2.
FIG. 3 is a schematic plan view similar to FIG. 1 of a modified form of device.

FIGS. 1–2 illustrate one form of the device for practicing the invention. As indicated therein, device 10 is used with a mushroom house or Phase II room 12 having a plurality of conventional compost beds 14 with doors 16 provided therebetween. Device 10 includes a blower 18 having a filter 20 for drawing air therein and blowing it into duct 22, 24 which provides a passageway communicating with the interior of manifold 26. A tubing or passageway 28 leads from manifold 26 to a connector 30 on each door 16. In the illustrated embodiment, mushroom house 12 has two doors 16, 16. If the mushroom house or Phase II room, however, has only one door, then only one tubing 28 would be necessary leading from the manifold 26, and baffle 40 could be dispensed. Similarly, if the mushroom house or Phase II room has three or more doors, then a like number of tubings 28 would be provided leading from manifold 26. Connectors 30 in doors 16 are exposed to the interior of mushroom house or Phase II room 12 thereby eliminating the necessity for tubing or duct work within the mushroom house or Phase II room.

The structural details of device 10 may vary to suit the particular needs of the grower. In the illustrated embodiment, filter unit 20 is 48 inches on each side with a depth of 24 inches. Manifold 26 is 30 inches long and 12 inches wide while tubes 28, 28 are 4 inch rubber tubings. Transition sections or connectors 32, 34 are provided on manifold 26 to make a transition for the squared manifold to the circular tubing. The details of the transition sections or connectors 32, 34 may also vary, and FIG. 1 shows two different forms, although in the preferred practice of the invention, a manifold would include the same type of connectors. The two forms are illustrated on the same manifold solely for illustrative purposes. Specifically connector 32 leads from a 6 inch by 6 inch extension 36 from manifold 26 and funnels into a circular outlet 4 inches in diameter to correspond to the diameter of tubing 28. The taper or funnel takes place, for example, over a 3 inch length. Connector 34, however, has a 12 inch wide side which tapers to the 4 inch diameter outlet side.

As later described, the invention includes controlling the temperature of the air which is gently blown into mushroom house or Phase II room 12. In this respect, the air is blown in at a low pressure of, for example, 0.1 to 8.5 psi. Under certain conditions, the temperature of the air drawn in from the atmosphere is not sufficiently high, and in the practice of the invention where the air temperature is controlled, it is necessary to increase the temperature. To accomplish this, a suitable heating means is employed. In the preferred practice of the invention, the heating means is a steam boiler 38 arranged to heat the air flowing through manifold 26. As illustrated in FIG. 1, manifold 26 includes baffle arrangement 40 disposed between duct 24 and the inlet line 42 of boiler 38. Since baffle 40 does not extend completely down manifold 26, the steam heats the air but any mixing of the air with steam is not significant. As illustrated in FIG. 1, baffle arrangement 40 comes to a point in line with the longitudinal center of duct work 24 so that the air flowing from duct work 24 is split into two streams into tubing 28, 28 to thereby provide good air distribution. In the event condensation in the air is a concern, such as in winter or where the compost is extra moist, a curtain 29 is disposed in front of each connector 30 to pick off condensation from the air. Curtain 29 may be located at any suitable location such as 5 feet in front of its connector 30 and may be made of any suitable material such as cloth.

As discussed in the Background Of Invention, it is conventional to use a steam boiler with prior art approaches as a means of supplying live steam. Such prior art boilers are of rather large capacity because of the necessity to use the boilers as a source of live steam which is introduced into the mushroom house or Phase II room. With the present invention, however, where the steam boiler functions solely to control the temperature of the air, a much smaller boiler would be sufficient such as a boiler of from 4 to 100 horsepower with a flow capacity of, for example, 5 gallons per hour.

FIG. 3 shows a modified form of device 50 which may be used in the practice of the invention. As illustrated therein, a filter 52 is provided to filter the air drawn in by blower 54. If desired, an intake silencer 56 may be provided between filter 52 and blower 54. The air is gently blown through passageway 58 into manifold 60 which includes at its outlet end a tee connector 62 having a pair of rubber tubings 64, 66 leading to the mushroom house of Phase II room as previously described.

In the arrangement of FIG. 3, a boiler (not shown) would also be provided with its steam inlet line 66 for heating the air flowing through manifold 60.

In order to facilitate monitoring the temperature in the compost beds 14, a plurality of temperature probes 68 such as thermocouples (FIG. 1) are provided at suitable locations in the mushroom house or Phase II room. If desired, the steam boiler, such as boiler 38 may be provided with a valve 70 (FIG. 1) or 72 (FIG. 3) which may be controlled in order to regulate the temperature of the fresh air gently blown into the mushroom house or Phase II room. The invention may be practiced by utilizing an electronic valve. For example, valve 70 or 72 may be connected to a temperature probe panel for automatically turning the steam on and off. Other options include the possibility of providing a formaldehyde injector for the manifold and further providing temperature probes in any suitable location including tubing 28 or 64 with various thermostatic controls thereby assuring that the in flowing air is at a proper temperature.

By regulating the temperature of the fresh air, the following advantages are achieved:

(1) the compost is forced to perform to its maximum conversion rate;
(2) sufficient oxygen is ensured during pasteurization (eliminate anaerobic Phase II);
(3) over-ride temperature is substantially eliminated;
(4) average bed temperatures below 150° F. is obtained;
(5) a uniform air temperature is maintained;
(6) the loss of dry matter (weight) is reduced;
(7) cfm requirements are reduced; and
(8) yield is increased.

As previously discussed, in the practice of the invention, it is not necessary to use an air handler which requires one cfm per square foot of growing area per 100 ton of compost. Rather with the practice of the invention, an efficient Phase II is achieved with an air handler which is rated at only, for example, 0.1–0.2 cfm per square foot of growing area per 100 ton of compost at 0.1–8.5 psi. The invention thus enables the mushroom grower who might believe that he is already using an efficient Phase II method to reduce the costs and provide such advantages over other methods by cutting the time required for Phase II (reducing the time from over a week, using conventional practices, to about 132–140 hours for Phase II, for the present invention), by reducing the amount of spawn required and by reducing the oil consumption.

With the practice of the invention, the improved Phase II enables the mushroom grower to assist the compost to biologically perform at its maximum efficiency. Additionally, with the use of fresh air instead of live steam, there is greater assurance of sufficient oxygen for microbial activity during the pasteurization process. The practice of the invention also results in obtaining uniform temperature throughout the air in the mushroom house or Phase II room within 1½ degrees during pasteurization, and the temperature may be monitored with highly sensitive probes such as thermocouples which are accurate to within 1° F. to assure that such uniform temperature is achieved. As later described, proper practice of the invention results in a pasteurization process wherein the average bed temperature is below 150° F. should the grower so desire.

A significant advantage of the invention is to minimize over-ride temperature at the post-pasteurization. In this respect, with the practice of the invention, when the pasteurization peak is reached, the temperature immediately begins to decrease. Any increase in temperature is referred to herein as over-ride temperature. With conventional practices of Phase II during the pasteurization stage because of the activity in the compost beds, when the external temperature is lowered, the temperature continues to ride past the pasteurization peak resulting in a comparatively high over-ride temperature and for a comparatively long period of time.

The invention also results in assisting in the unnecessary loss in dry weight of the compost by adding energy which would normally come from the biology of the compost which decreases the dry matter (weight) thus decreasing the potential yield.

Many other advantages inherently stem from the invention. In this respect, since the mushroom house or Phase II room is not subjected to the high temperatures and pressures and high humidity of the prior art practices which utilizes, for example, live steam at 330° F. at 100–125 psi, the mushroom house of Phase II room would be expected to have a longer life. Further with the practice of the invention, it is possible to obtain such an efficient compost that a spawning ratio of one quart per 18.33 square feet is as efficient as one quart per 13.75 feet which is an increase of 33.3% square feet per quart.

Figure 5:
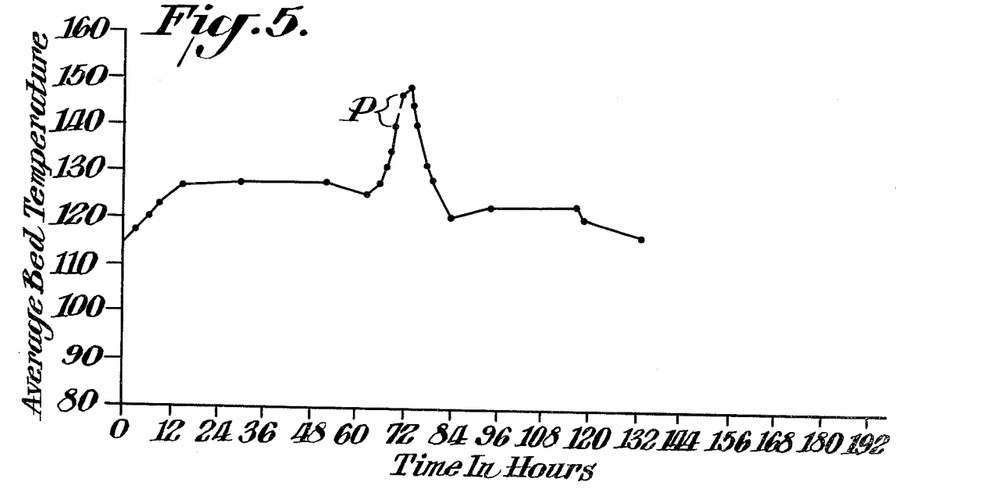
Figure 10:
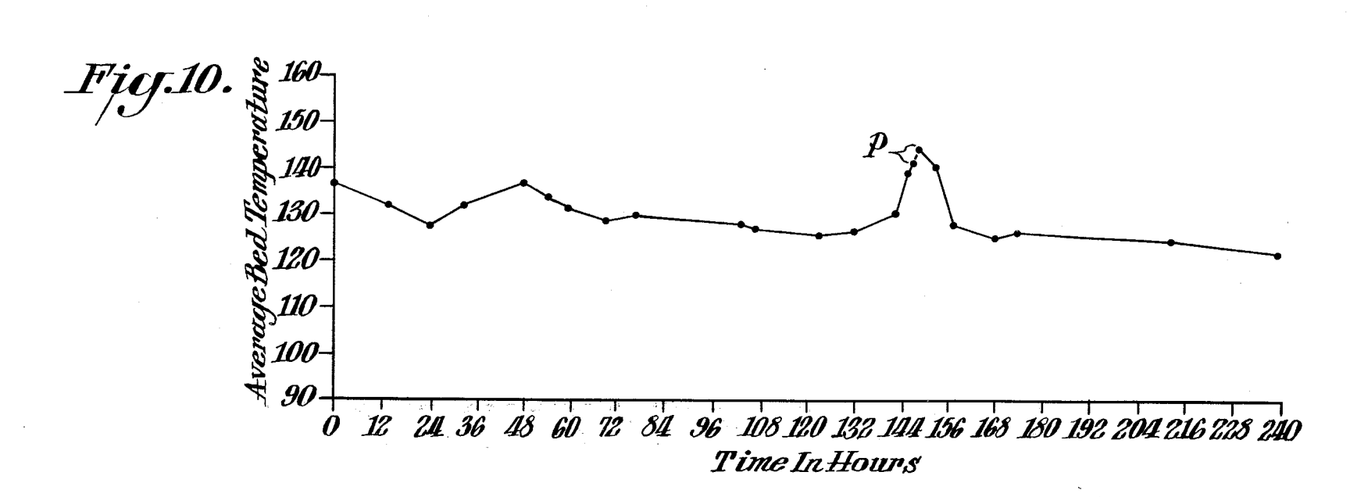
Figure 13:
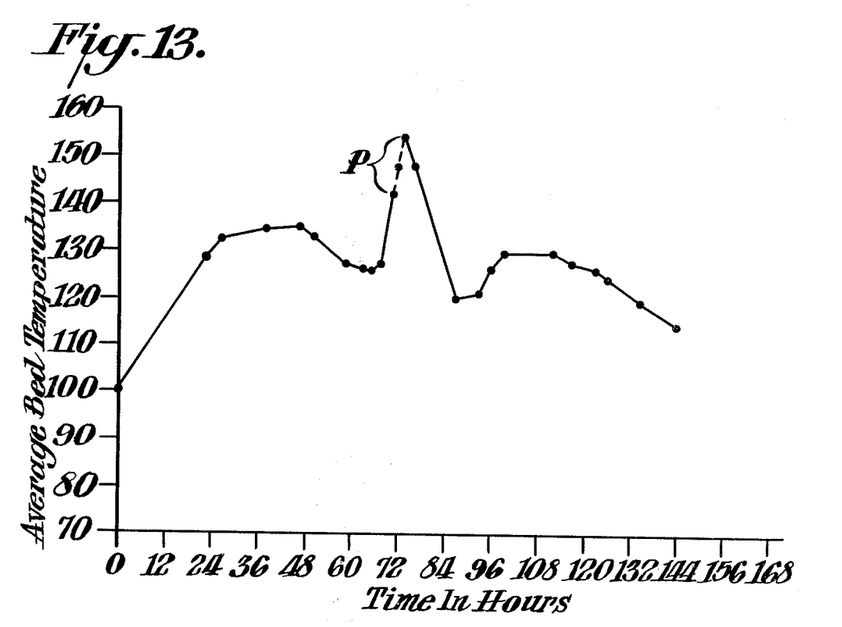

Table I lists various results with the practice of the invention and indicates the specific time of the year in southeastern Pennsylvania as well as various parameters indicated therein. As is apparent from Table I, the practice of the invention generally results in a fairly small air temperature difference at the peak as well as a minimal over-ride temperature and minimal time at the peak and minimal time to break the peak.

an average reading of 8 probes except for FIGS. 10 and 13 (7 probes) and FIG. 5 (9 probes). It is noted that this set of figures represents complete tests results including certain results which while a practice of the invention do not best reflect the expected results of the invention but which nevertheless are included for the sake of completeness.

Each figure indicates as the designation "P" and by the broken line when the pasteurization peak is reached.

Figure 4:
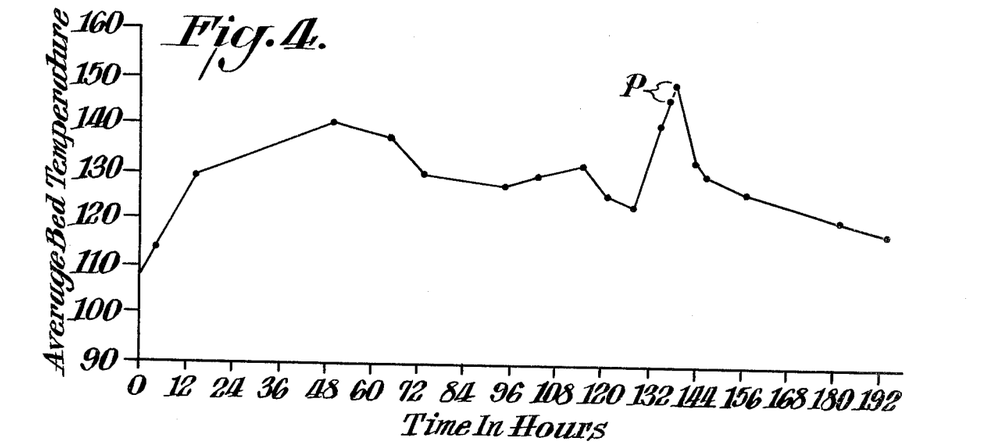
FIGS. 4–14 are graphs plotting the average bed temperature against time for various exemplary practices of this invention.
Figure 6:
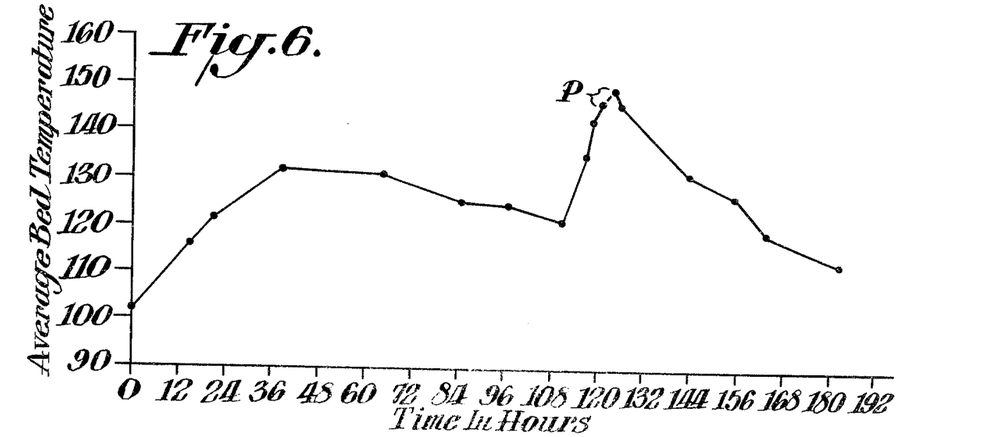
Figure 7:
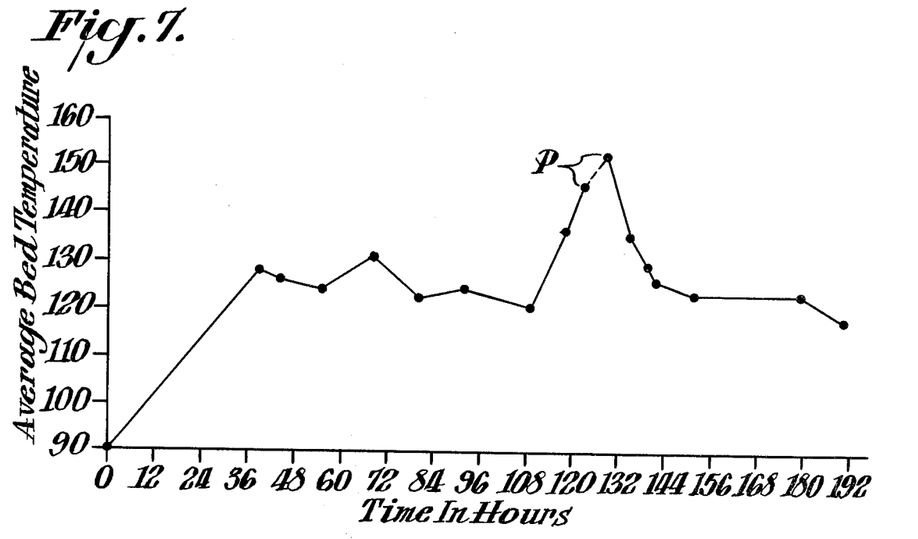

With reference to FIGS. 4–9, it is noted that FIG. 4 represents a mushroom house in September for 1½ hours pasteurization with 0° F. over-ride. FIG. 5 represents the same mushroom house as FIG. 4 during July with 3 hours pasteurization 1.3° F. over-ride temperature and one hour required to break the pasteurization peak. FIG. 6 represents a different mushroom house in October with 4 hours pasteurization and 0° F. over-ride. FIG. 7 represents yet another mushroom house in February for 5 hours pasteurization with 0° F. over-ride.

TABLE I

| Month House Filled | Compost (Cu. Yds.) | Air Diff at Peak (°F.) | Avg. Bed Temp. at End of Peak (°F.) | # Hrs. at Peak | Avg. Over-Ride (°F.) | Time to break Peak (Hrs) |
| --- | --- | --- | --- | --- | --- | --- |
| July | 115 | .6 | 146.1 | 1.75 | 1.2 | 2.0* |
| Aug | 120 | .1 | 144.6 | 2.5 | .7 | 1.25 |
| Sept | 165 | 1.4 | 149.3 | 2.0 | .7 | 1.0 |
| Sept | 145 | .1 | 148.3 | 1.5 | 0 | 0 |
| Oct | 175 | 2.8** | 149.2 | 2.0 | 0 | 0 |
| Oct | 175 | unknown*** | 150.7 | 4.5 | 0 | 0 |
| Nov | 165 | .4 | 157.4 | 6.0**** | 0 | 0 |
| Nov | 160 | .3 | 149.4 | 2.25 | 0 | 0 |
| Dec | 170 | .7 | 148.3 | 3.0 | 0 | 0 |
| Dec | 140 | 1.2 | 150.5 | 1.5 | 1.0 | 1.0 |

*first house done
**air difference results in part to structural condition of house
***insect experiment (air temperature not recorded)
****insect experiment and temperature experiment to determine length of time at peak

TABLE II

| House # | Month Filled | Method of Pasteurization | Compost (Cu. Yds.) | Duration of Peak (Hrs.) | Air Diff. at Peak Between Top and Bottom (°F.) | Avg. Bed Temp. (°F.) | Duration of Phase II (Days) | # of Spawn Run (Days) | 1st Break Yield | Type of Spawn | # of flies monitor. up to 2nd Break |
| --- | --- | --- | --- | --- | --- | --- | --- | --- | --- | --- | --- |
| A | July | T.C.O. | 115 | 1.75 | .6 | 146.1 | 5 | 15 | 1.004 | White A | 40,795 |
| A | Aug | Live Steam | 140 | | | 155 | 13 | 22 | .72 | White A | |
| A | Sept | T.C.O. | 145 | 1.5 | .1 | 148.3 | 7.5 | 16 | 1.23 | White A | 5,455 |
| A | Sept | Live Steam | | | | 158 | 15 | 27 | 1.02 | Off White A | |
| B | Aug | T.C.O. | 120 (anaerobic) | 2.5 | .1 | 144.6 | 9 | 15 | 1.09 | White A | 7,332 |
| B | Aug | Live Steam | 140 | | | 152.5 | 13 | 18 | 1.255 | White A | |
| B | June | Live Steam | 110 | | | 146 | 13 | 23 | .71 | White A | |
| B | Nov | T.C.O. | 165 | 6 | .4 | 157.4 | 10 | 20 | 1.6 | White A | 10,170 |
| C | Sept | T.C.O. | 165 | 2 | 1.4 | 149.3 | 8.5 | 19 | .92 | White A | 2,650* |
| C | Nov | Live Steam | 180 | | | 154 | 10 | 17 | .78 | Off White A | |

*Mummy

Table II shows comparative results with the practice of the invention which is designated in Table II as T.C.O. and prior art practices designated by the indication "Live Steam". Table II further includes a column to indicate the use of the same or different house and also indicates the time of year as well as the various conditions and parameters noted therein. As apparent from Table II, the use of live steam results in a higher bed temperature for a comparable time of year for the same house. Further the duration of Phase II is significantly lower as is the number of days of spawn run with the practice of the invention.

Figure 8:
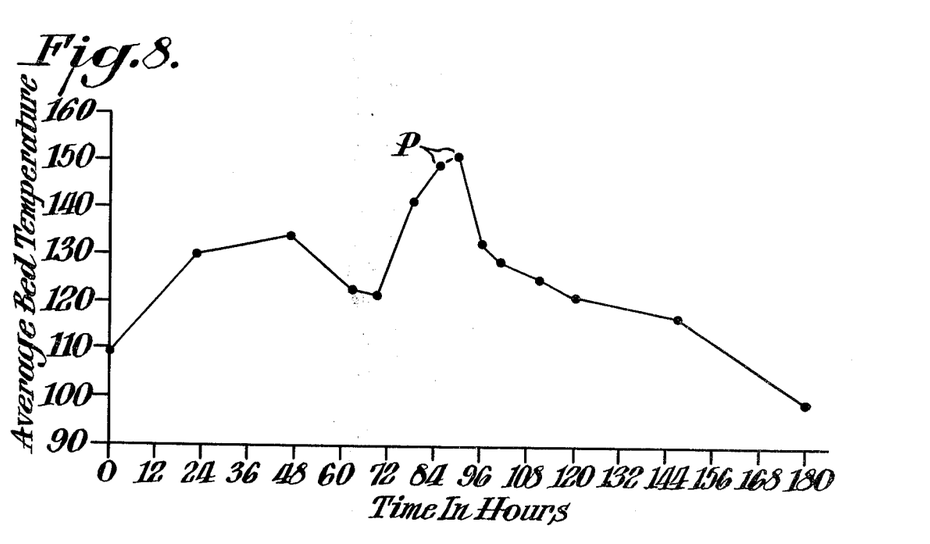
Figure 9:
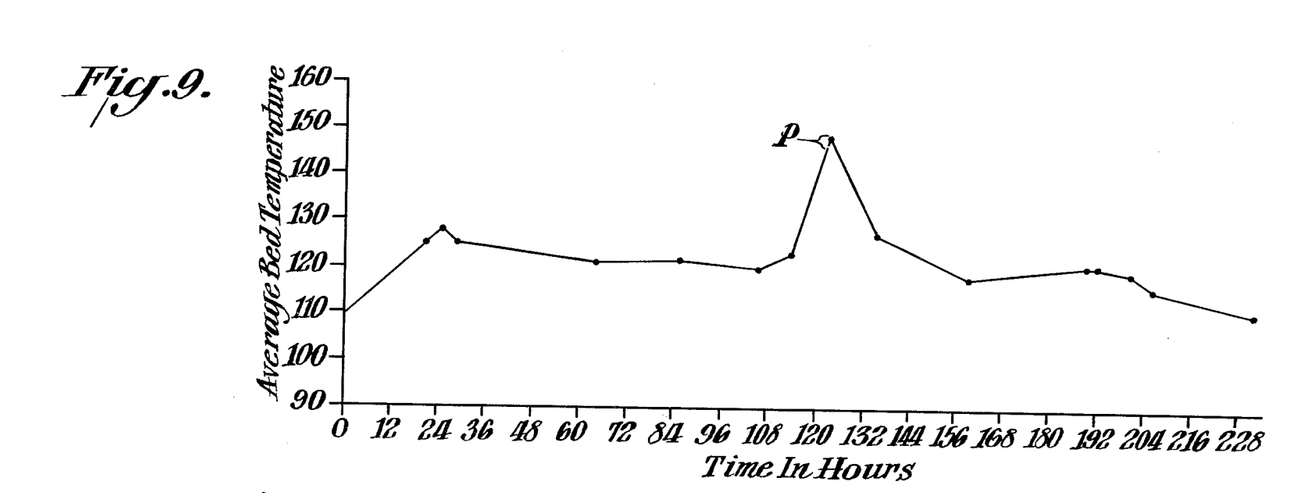

FIGS. 4–14 illustrate the average bed temperature plotted against time in various practices of the invention. The bed temperature indicated therein represents FIG. 8 represents yet another mushroom house in October for 6 hours pasteurization and 0° F. over-ride. FIG. 9 represents still another mushroom house in December with ½ hour pasteurization and 0° F. over-ride.

FIGS. 4–9 represent a low temperature Phase II with the temperature controlled oxygen being the practice of the invention. FIGS. 10–12 and 14, however, represent a conventional type Phase II with a temperature controlled oxygen pasteurization. FIG. 13 represents a modified low temperature type Phase II with temperature controlled oxygen in accordance with the invention.

Figure 11:
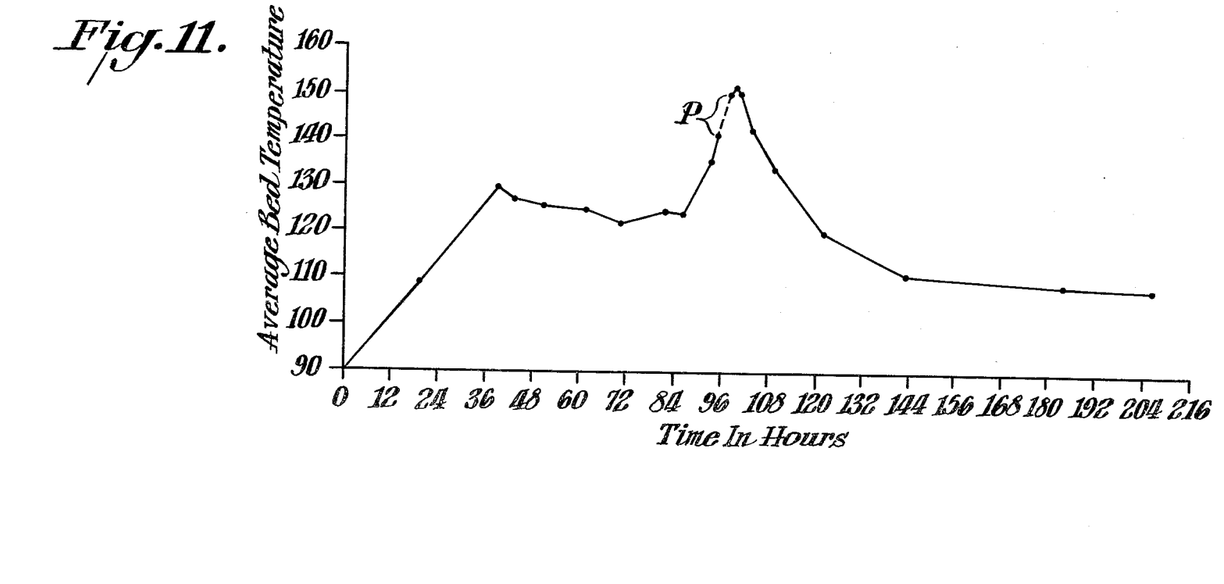
Figure 12:
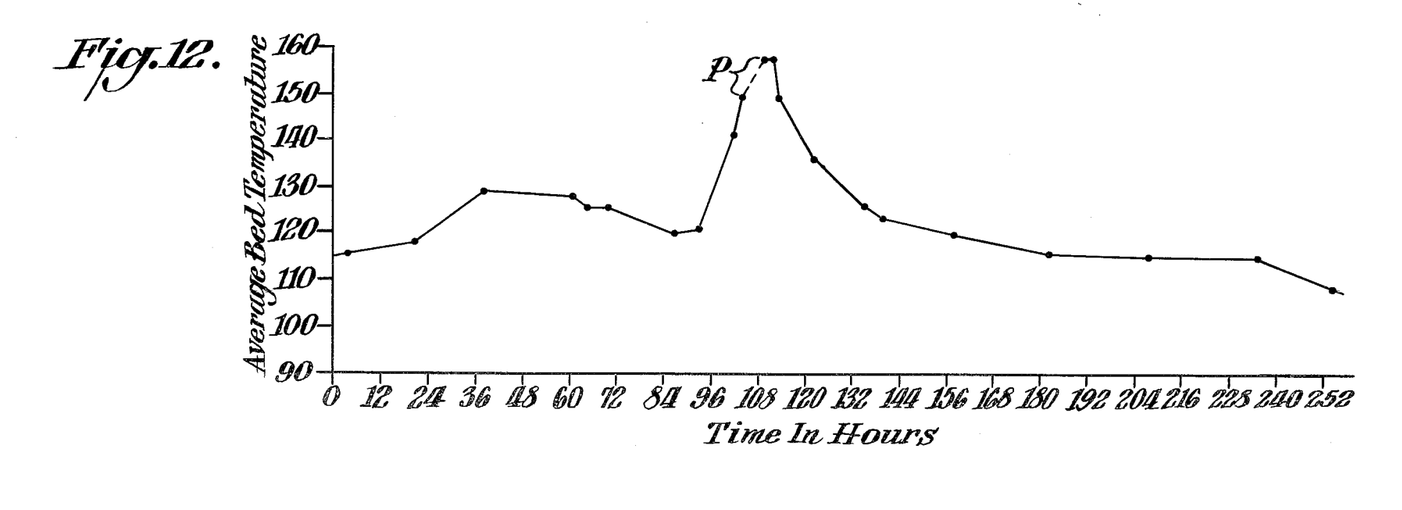
Figure 14:
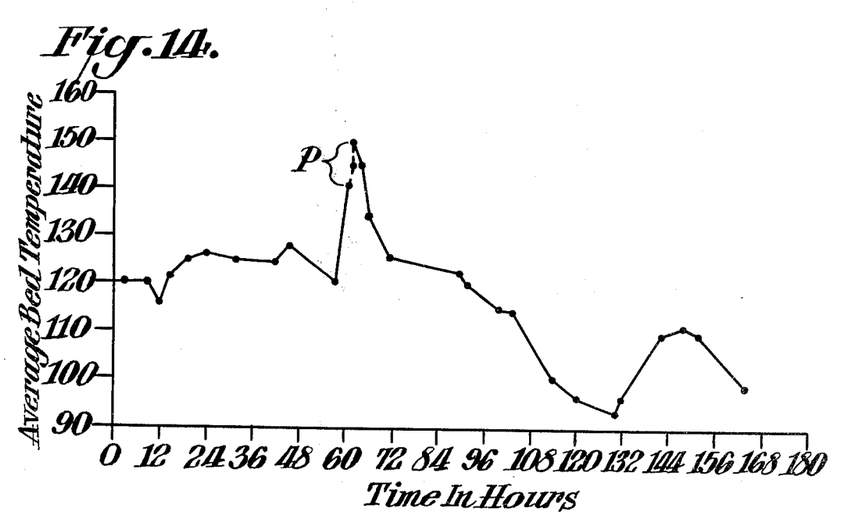

FIG. 10 represents the same mushroom house as FIG. 7 during September with 1¼ hour pasteurization and an over-ride temperature of 0.7° F. with ¾ hour required to break the peak. FIG. 11 illustrates the same mushroom housing as FIGS. 4 and 5 in December with 3 hour pasteurization and an over-ride temperature of 1.0° F. with ½ hour required to break the peak. FIG. 12 illustrates the same mushroom house as FIGS. 7 and 10 in November for 6 hour pasteurization with an over-ride temperature of 0° F. FIG. 13 illustrates the same mushroom house as FIG. 8 in March with 4 hour pasteurization and an over-ride temperature of 0° F. FIG. 14 illustrates the same mushroom house as FIGS. 8 and 13 in November with 2 hour pasteurization and 0° F. override.

FIGS. 4-8 illustrate that the bed temperature approaches on a generally steady incline the pasteurization temperature, but once the pasteurization temperature is reached, the bed temperature tapers off. Additionally these figures demonstrate how the compost temperature can be manipulated by the particle of the invention wherein there is temperature controlled oxygen. FIG. 5 also is particularly noteworthy in that on the downside of the peak when approaching the post-pasteurization stage the invention can eliminate and stabilize the bed temperatures that would tend to bottom out.

As previously indicated, the set of examples illustrated in FIGS. 4-14 is included for the sake of completeness even where the examples do not depict the best practice of the invention. Thus, FIG. 6 includes results which are not as desirable since they are influenced by the structural conditions of mushroom house which was over thirty years old, of very loose construction, with cinder block dirt floors and little insulation. This same mushroom house is footnoted in Table I.

The set of graphs illustrated in FIGS. 9-12 deomonstrate that the invention utilizing temperature controlled oxygen pasteurization can be used in generally conventional Phase II and be effective and efficient. The prolonged pre-pasteurization period of FIGS. 9 and 10 is a result of insufficient temperatures. FIGS. 11 and 12 denote an inefficient post-pasteurization due to lack of control to stabilize the temperature with restricting fresh air.

FIG. 13 indicates the ability to utilize the invention for controlling a high temperature Phase II even supplemented with oil.

At the end of the conventional Phase II in the FIG. 14 experiment, ammonia was still present in the compost due to insufficient conversion. An air handler, in accordance with this invention, for providing fresh air was applied for 30 hours to complete NH$_3$ release thus this experiment shows how the practice of the invention can effectively eliminate ammonia from the compost after completion of Phase II.

Additional experiments were conducted to evaluate the practice of the invention. For example, mold observations were made in the following manner. In five tests, a total of 28,000 square feet of growing area was supplemented with a denatured protein at spawning to initiate either competitive or indicator molds (i.e., chaeotomium olivaceum, white plastic mold, monilia femicole, fungus) due to an inefficient Phase II. All tests were negative. In a total of thirteen tests comprising 74,600 square feet of growing area, no ink caps (cop rinus atramentarius) showed.

Further tests were conducted for pest kill effectiveness. In this respect in two tests, adult sciarid flies and larve were placed in the coldest portions of the mushroom house, survival rate was zero (0).

As can be appreciated, the practice of this invention which involves the utilization of gently blowing fresh air for achieving temperature controlled oxygen thereby results in a significant advancement in maximizing the efficiency of Phase II.

What is claimed is:

1. In a method of conditioning mushroom compost during Phase II wherein compost in beds is pasteurized in a mushroom house or Phase II room for promoting aerobic thermophilic actinomycetes and fungi, the improvement being introducing into the mushroom house or Phase II room at low pressure during pasteurization of the compost a constant volume of fresh air which is oxygen rich by feeding the air under positive pressure from externally of the mushroom house or Phase II room into the mushroom house or Phase II room through an opening in its wall, the feeding of air being at a rate of substantially less than 1 cfm per square foot of growing area per 100 tons of compost at a pressure in the range of 0.1 to 8.5 psi, and controlling the temperature of the air entering the mushroom house of Phase II room to obtain a controlled constant volume of temperature controlled air therein without the use of internal ducts to create a uniform temperature at the pasteurization peak temperature throughout the interior of the mushroom house or Phase II room and thereby reducing the temperature of the compost during post-pasteurization immediately after the pasteurization peak is reached with minimal override temperature.

2. In the method of claim 1 including controlling the temperature of the air introduced into the mushroom house or Phase II room by heating the air before it is introduced into the mushroom house or Phase II room when the air is below a desired temperature.

3. In the method of claim 2 wherein the air is heated by a steam boiler having a capacity of about 5 gallons per hour.

4. In the method of claim 1 wherein the rate is in the range of 0.1 to 0.2 cfm.

* * * * *